(12) United States Patent
Grohman

(10) Patent No.: US 8,158,044 B2
(45) Date of Patent: Apr. 17, 2012

(54) METHOD OF FORMING COMPOSITE ARTICLES

(75) Inventor: Martin Grohman, Biddeford, ME (US)

(73) Assignee: Integrity Composites, LLC, Biddeford, ME (US)

( * ) Notice: Subject to any disclaimer, the term of this patent is extended or adjusted under 35 U.S.C. 154(b) by 0 days.

(21) Appl. No.: 12/115,814

(22) Filed: May 6, 2008

(65) Prior Publication Data

US 2008/0203603 A1    Aug. 28, 2008

Related U.S. Application Data

(62) Division of application No. 11/267,382, filed on Nov. 4, 2005.

(51) Int. Cl.
B29C 47/06 (2006.01)
B29C 47/00 (2006.01)
B32B 7/00 (2006.01)

(52) U.S. Cl. ............ 264/173.16; 264/211; 425/97; 425/113; 425/131.1; 428/98; 428/212; 428/218; 524/13

(58) Field of Classification Search .................. None
See application file for complete search history.

(56) References Cited

U.S. PATENT DOCUMENTS

| | | | |
|---|---|---|---|
| 3,385,749 A | 5/1968 | Hampshire | |
| 3,720,572 A | 3/1973 | Soda et al. | |
| 3,935,047 A | 1/1976 | Shinomura | |
| 4,045,528 A | 8/1977 | Urmanov | |
| T967,003 I4 | 2/1978 | Witt et al. | |
| 4,112,162 A | 9/1978 | Casselbrant | |
| 4,364,984 A | 12/1982 | Wentworth | |
| 4,379,806 A * | 4/1983 | Korpman | 428/354 |
| 4,594,211 A * | 6/1986 | Mohnhaupt | 264/141 |
| 4,731,004 A * | 3/1988 | Wenz, Jr. | 425/133.5 |
| 5,047,196 A * | 9/1991 | Zuckerberg et al. | 264/173.14 |
| 5,108,678 A | 4/1992 | Hirasaka et al. | |
| 5,393,536 A | 2/1995 | Brandt et al. | |
| 5,486,553 A | 1/1996 | Deaner et al. | |
| 5,497,594 A | 3/1996 | Guiseppe et al. | |
| 5,554,429 A | 9/1996 | Iwata et al. | |
| 5,700,555 A | 12/1997 | Grill | |
| 5,716,570 A * | 2/1998 | Peiffer et al. | 264/146 |
| 5,718,786 A | 2/1998 | Lindquist et al. | |
| 5,736,218 A | 4/1998 | Iwata et al. | |
| 6,133,349 A * | 10/2000 | Hughes | 524/13 |
| 6,197,709 B1 | 3/2001 | Tsai et al. | |
| 6,344,268 B1* | 2/2002 | Stucky et al. | 428/317.9 |
| 6,497,937 B1 | 12/2002 | Lam et al. | |
| 6,579,605 B2* | 6/2003 | Zehner | 428/319.9 |
| 6,586,503 B1 | 7/2003 | Grohman | |
| 6,638,612 B2 | 10/2003 | Jones | |
| 6,641,914 B2* | 11/2003 | Lu | 428/355 AC |
| 6,716,522 B2* | 4/2004 | Matsumoto et al. | 428/326 |
| 6,737,006 B2 | 5/2004 | Grohman | |
| 6,821,614 B1 | 11/2004 | Dubelslen et al. | |
| 6,827,995 B2* | 12/2004 | Hughes et al. | 428/36.5 |
| 6,852,405 B2* | 2/2005 | Wanat et al. | 428/332 |
| 7,421,830 B1* | 9/2008 | Hughes et al. | 52/783.1 |

(Continued)

*Primary Examiner* — Jeffrey Wollschlager

(74) *Attorney, Agent, or Firm* — Preti Flaherty Beliveau & Pachios LLP

(57) ABSTRACT

A method for forming a composite article includes injecting first and second compositions into a die head at different points so as to produce a partially mixed composition that is discharged from the die head. The second composition contains less filler material than the first composition.

4 Claims, 4 Drawing Sheets

U.S. PATENT DOCUMENTS

| | | | |
|---|---|---|---|
| 7,473,722 B2 * | 1/2009 | Guiselin et al. | 523/218 |
| 2002/0025420 A1 * | 2/2002 | Wanat et al. | 428/213 |
| 2003/0154662 A1 | 8/2003 | Bruchu et al. | |
| 2005/0186433 A1 * | 8/2005 | Hetzler et al. | 428/421 |
| 2007/0045893 A1 * | 3/2007 | Asthana et al. | 264/173.12 |

* cited by examiner

METHOD OF FORMING COMPOSITE ARTICLES

CROSS REFERENCES TO RELATED APPLICATIONS

This application is a Divisional of copending U.S. patent application Ser. No. 11/267,382, filed Nov. 4, 2005 and hereby incorporated by reference.

BACKGROUND OF THE INVENTION

This invention relates generally to wood replacement materials (i.e., materials suitable for use as a replacement for natural wood) and more particularly to composite wood replacement articles and extrusion processes for forming such articles.

Although wood is a naturally reproducible resource, the supply of good wood for construction and other purposes is diminishing because of a large worldwide demand for wood products. Accordingly, there is increasing interest in developing wood replacement products. Wood composites represent one such replacement product. Wood composites comprising a combination of recycled wood scraps (such as wood meal, wood chips, sawdust, newspapers and the like, which are by-products of industrial processes and other industries using natural wood products) and a thermoplastic material have been known for many years. Generally, these composites are formed so that they may be used in many of the same applications as natural wood products, while offering advantages such as high resistance to rot, insects, and moisture. These products can have the same workability as wood and are typically splinter-free.

It is common with wood composites to include various additives to protect against discoloration, mildew, ultraviolet light exposure, etc. However, such additives can be very expensive, particularly when the additives are incorporated throughout the entire wood composite component. To address the high cost of these additives, multi-layer or laminated wood composite products comprising a substrate layer and a thin cap layer disposed on at least one surface of the substrate layer have been proposed. The substrate layer comprises a polymer/fiber mixture that produces the primary advantages of wood composites, i.e., wood-like stiffness and strength and low contraction and expansion. The cap layer comprises a mixture of polymer and additives, such as pigments and stabilizers, for protecting the substrate layer. By limiting the additives to the thin cap layer, this approach reduces the amount and cost of the additives while still providing the desired protection. A drawback of these laminated wood composites, however, is that the distinct cap layer can be susceptible to delamination and/or a negative market perception.

SUMMARY OF THE INVENTION

In one embodiment, the present invention provides a composite article including a matrix having first and second opposing surfaces defining a transverse dimension and a filler material embedded in the matrix. The filler material presents a density gradient in the transverse dimension wherein a minimum filler density is at the first surface.

In another embodiment, the present invention provides a non-laminated composite article having first and second opposing surfaces defining a transverse dimension. The non-laminated composite article includes a matrix and a filler material embedded in the matrix and defines first and second regions juxtaposed along the transverse dimension wherein the first region encompasses the first surface. The first region has a filler-to-matrix ratio that varies along the transverse dimension, the filler-to-matrix ratio being at a minimum at the first surface. The first region can include one or more additives.

In yet another embodiment, the present invention provides a method of forming a composite article having first and second opposing surfaces defining a transverse dimension. The method includes providing a die head having an outlet and injecting a first composition into the die head at a first point to create a first stream. The first composition includes a combination of matrix and filler materials. The method further includes injecting a second composition into the die head at a second point to create a second stream. The second composition contains less (or no) filler material than the first composition. The second point is located relative to the outlet so as to permit a degree of mixing between the first and second streams so as to produce a partially mixed composition stream that is discharged through the outlet.

The present invention and its advantages over the prior art will be more readily understood upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
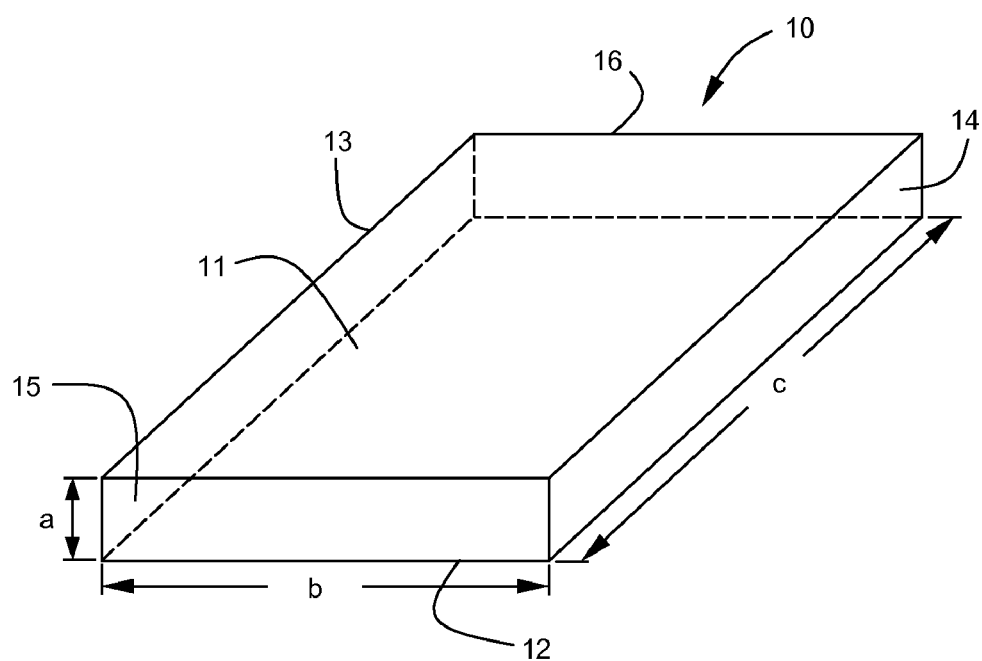
FIG. 1 is a perspective view of a composite article in accordance with a first embodiment of the present invention.
Figure 2:
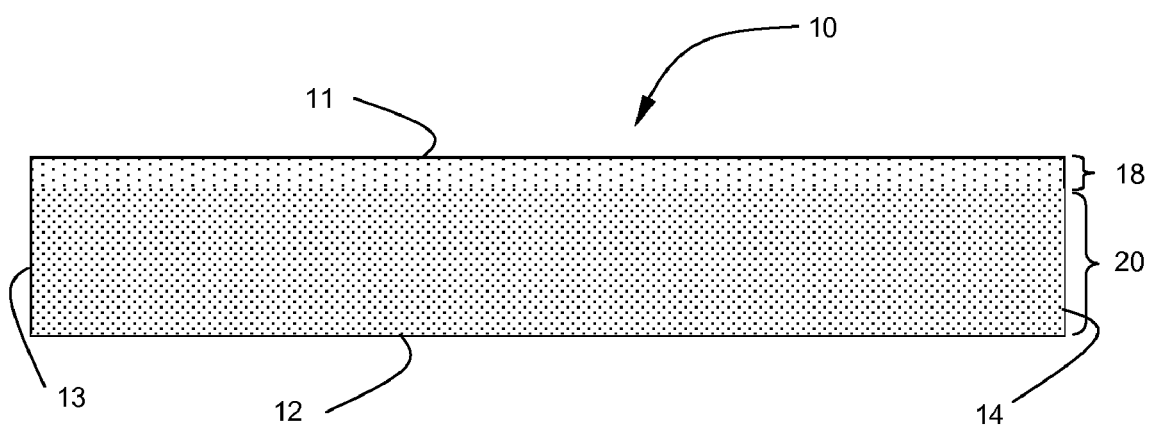
FIG. 2 is a side view of the composite article of FIG. 1.

Referring to the drawings wherein identical reference numerals denote the same elements throughout the various views, FIGS. 1 and 2 show a composite article 10 that can function as a wood replacement product. In the illustrated embodiment, the composite article 10 is a board having six planar surfaces: first and second opposing faces 11 and 12, first and second opposing sides 13 and 14, and first and second opposing ends 15 and 16. The composite article 10 defines a first transverse dimension a, also referred to as the thickness, a second transverse dimension b, also referred to as the width, and a longitudinal dimension c, also referred to as the length. The dimensions a, b and c can be of any desired value. For instance, the composite article 10 could be a 1"×6" board that is 8 feet long or a 2"×4" board that is 10 feet long. It should be noted that the flat board configuration shown in FIGS. 1 and 2 is shown only by way of example. The present invention is not limited to this particular configuration and will apply to composite articles having many other shapes and sizes.

The composite article 10 generally comprises a matrix having a filler embedded therein. Any desired combination of matrix and filler materials can be used, although for wood replacement products the matrix will typically comprise a plastic material and the filler will typically comprise a cellulosic material. Examples of suitable matrix materials include, but are not limited to, polymers such as polypropylene, high density polyethylene (HDPE), low density polyethylene (LDPE), polyvinyl chloride (PVC), chlorinated polyvinyl chloride (CPVC), acrylonitrile butadiene styrene (ABS), ethyl-vinyl acetate (EVA), and polystyrene. Preferred cellulosic filler materials include, but are not limited to, sawdust, newspaper, alfalfa, wheat pulp, wood scraps (e.g., ground wood, wood flour, wood flakes, wood chips, wood fibers, wood particles), wood veneers, wood laminates, cardboard, straw, cotton, rice hulls, paper, coconut shells, peanut shells, bagasse, plant fibers, bamboo fiber, palm fiber, kenaf, and mixtures thereof. In one embodiment, the average particle size of the cellulosic filler material is less than about ½ inch, and preferably from about 1/32-1/16 inch. In addition, the particles of the cellulosic filler material have an average aspect ratio (i.e., the ratio of the length to the widest thickness) of at least about 10:1, preferably at least about 20:1, and more preferably from about 30:1 to about 50:1. The use of such long particles increases the flexural modulus of the composite article, thus providing a stiffness comparable to natural wood.

The composite article 10 can also include a number of optional additives, such as process aids, lubricants, stabilizers, accelerators, inhibitors, enhancers, and colorants, which modify or adjust certain properties of the composite article. As will be described in more detail below, the use of such additives is generally limited to one or more specific regions of the composite article 10. Examples of such additives include, but are not limited to, UV stabilizers (e.g., CYTEC 38535, CYTEC 3346) and acrylic process aids (e.g., Rohm and Haas K175, Kaneka Kane-Ace PA-101). Examples of lubricants include zinc stearate, calcium stearate, esters, amide wax, paraffin wax, ethylene bis-stearamide, and other suitable materials.

The composite article 10 is a non-laminated article. That is, the composite article 10 does not comprise distinct layers, but only a single layer. The composite article 10 defines two regions 18 and 20 of differing compositional makeups. In the illustrated embodiment, the two regions 18 and 20 are juxtaposed along the first transverse dimension (i.e., across the thickness) so that first region 18 encompasses the first face 11 and the second region 20 encompasses the second face 12. Generally, the second region 20 comprises a large majority of the thickness of the composite article 10 and is thus thicker than the first region 18. In one embodiment, the first region 18 is approximately 1/16 to 1/8 inches deep, with the second region 20 comprising the remainder of the article thickness.

The two regions 18 and 20 both generally comprise a matrix-filler composite but have differing compositional makeups. Namely, the first region 18 has a lower filler content than the second region 20. Although the first region 18 contains less filler than the second region 20, it is generally preferred that the filler content of the first region 18 is not zero. The first region 18 preferably contains some filler in order to enhance the wood-like appearance of the first face 11. In one embodiment, the first region 18 comprises approximately 1-2% filler by weight and the second region 20 comprises approximately 60% filler by weight.

In addition, the first region 18 preferably includes one or more additives, such as the additives described above, which are not included in the second region 20. In other words, only the first region 18 has the additives, thereby achieving the benefits of the additives at the first face 11, but reducing the cost by not having additives throughout the entire thickness of the board. The thick second region 20, with its high filler content, lends wood-like stiffness and strength to the composite article 10. It is possible that the second region 20 includes some additives or materials other than matrix and filler, but the relatively high concentrations of protective additives of the type discussed above are generally limited to the first region 18.

Figure 3:
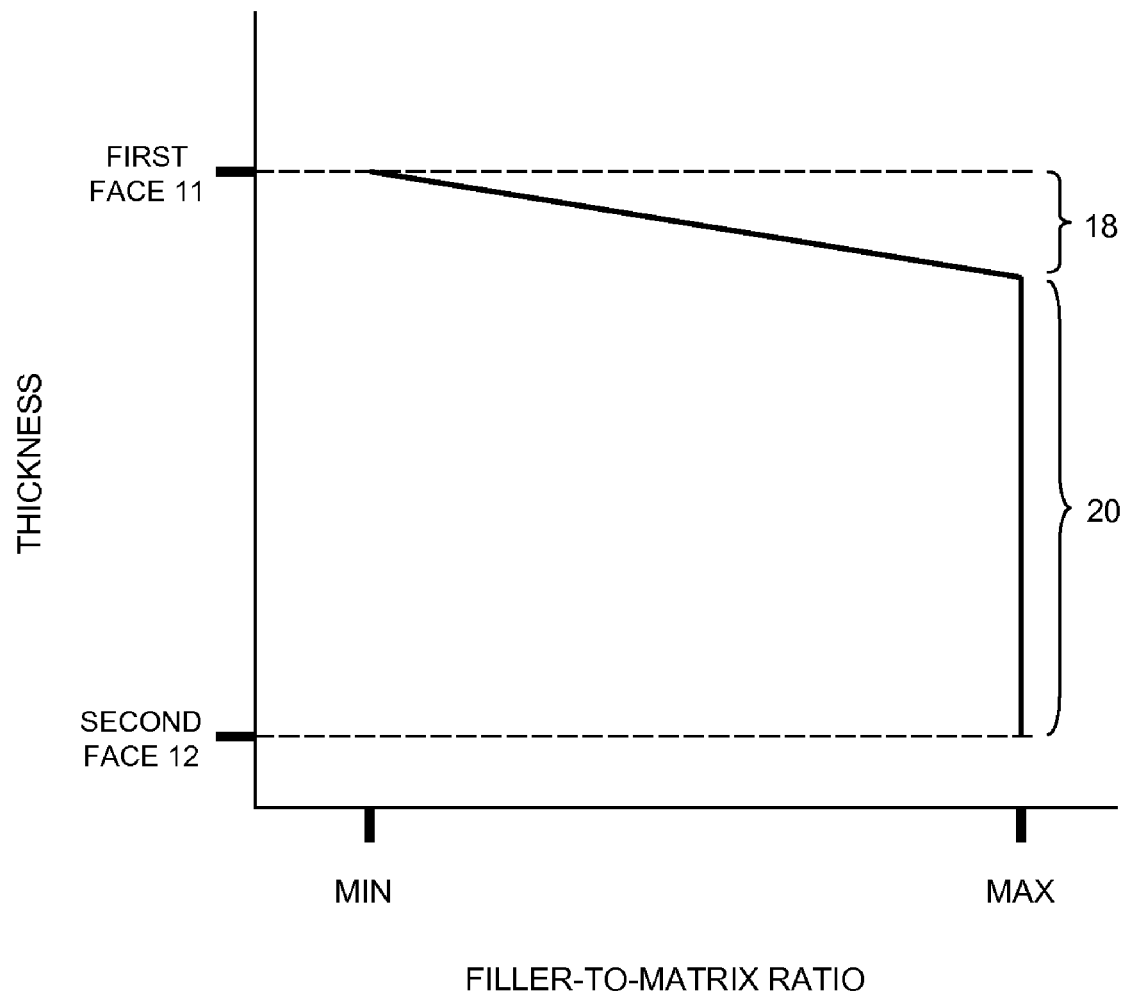
FIG. 3 is a graph plotting the filler-to-matrix ratio against article thickness for the composite article of FIG. 1.

The filler material in the first region 18 is distributed so as to present a density gradient along the first transverse dimension of the composite article 10, so that the filler density changes gradually (as opposed to abruptly) along the first transverse dimension with the minimum filler density being at the first face 11. That is, the filler content varies in density or concentration across the thickness of the first region 18. Another way of stating this is that the ratio of filler material to matrix material (the "filler-to-matrix ratio") varies in the transverse dimension in the first region 18, and specifically decreases approaching the first face 11. This is depicted graphically in FIG. 3, which plots the filler-to-matrix ratio across the thickness of the composite article 10. As shown, the filler-to-matrix ratio is at a uniform maximum in the second region 20 and decreases in the first region 18, with the minimum ratio (and hence minimum filler density) occurring at the first face 11. While the rate of change of the filler-to-matrix ratio in the first region 18 is shown to be linear in FIG. 3, it should be noted that this rate of change could also be non-linear.

While the above description describes the filler density gradient as occurring along the first transverse dimension, it should be noted that an alternative embodiment is possible in which the filler density gradient occurs along the second transverse dimension b (i.e., across the width of the composite article 10). In this case, one of the sides 13 and 14 would present an additive-protected surface having a minimum filler density. It is also possible to provide a filler density gradient along the longitudinal dimension c, or length, of the composite article 10, although there may not be much benefit in making one of the ends 15 and 16 an additive-protected surface.

Figure 4:
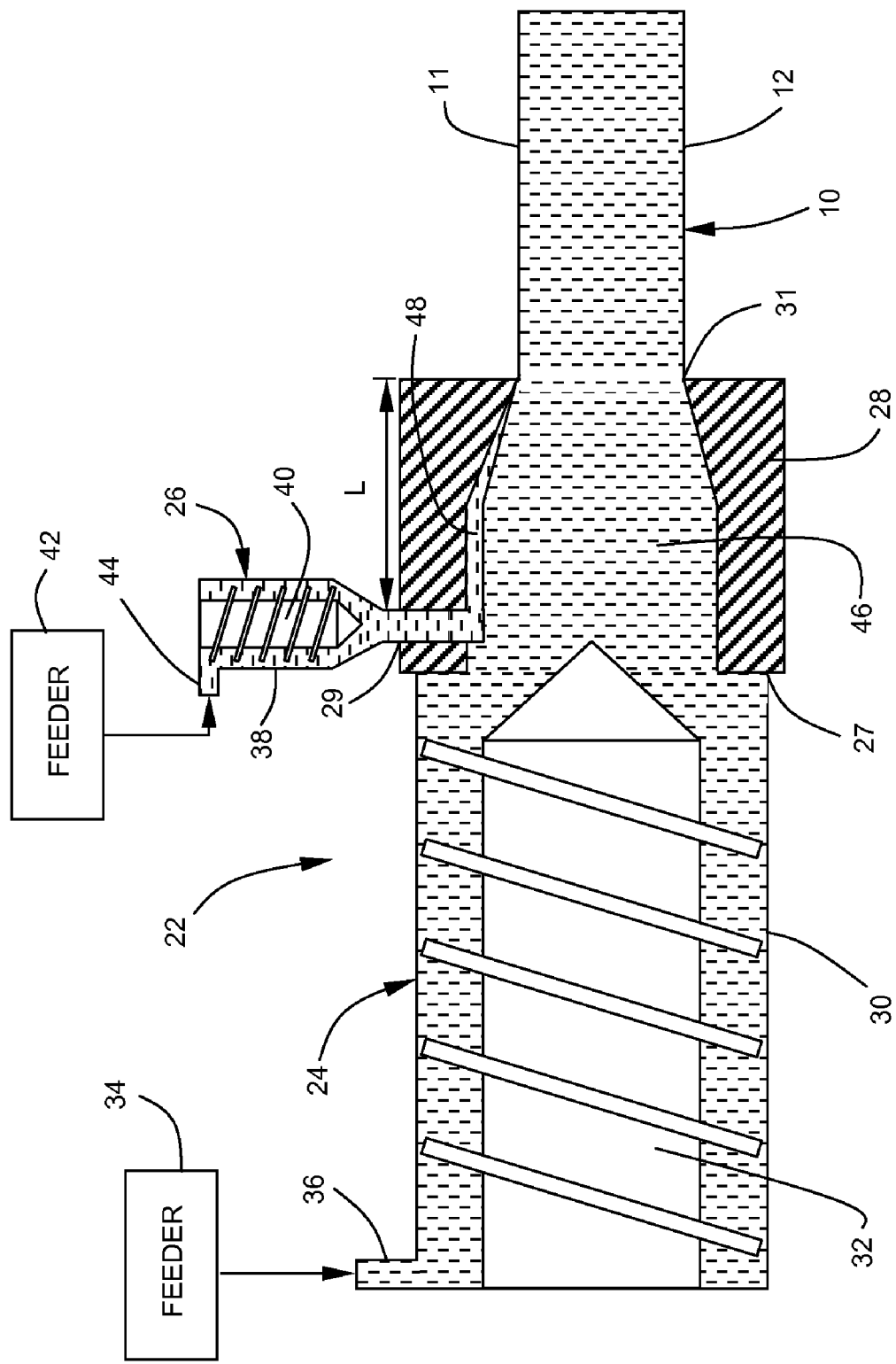
FIG. 4 is a schematic view of an extrusion system capable of forming a composite article.

Referring now to FIG. 4, one method of forming the composite article 10 is shown. In this approach, the composite article 10 is extruded using an extrusion system 22 having first and second extruders 24 and 26 connected to a die head 28. The first extruder 24 injects a first composition into the die head 28 at a first point 27, and the second extruder 26 injects a second composition into the die head 28 at a second point 29. The die head 28 has an outlet 31 through which extruded material is discharged.

The first extruder 24 comprises a barrel 30 having an internal chamber. A screw 32 is rotatively mounted in the chamber of the barrel 30. (Although single screw extruders are shown in FIG. 4, it should be noted that the multi-screw extruders having two or more intermeshing screws could alternatively be used.) The screw 32 is provided with one or more helical threads such that, when rotating, the screw 32 will convey raw materials through the barrel chamber. The mechanical action of the screw 32 will also heat and mix the raw materials. In addition, barrel heaters, such as electrical resistance heaters or the like (not shown), can be provided for providing additional heating of the raw materials in the barrel chamber. The raw materials or ingredients making up the first composition are physically mixed or blended (typically in powder or pellet form) in a feeder 34 such as a weigh blender. These mixed ingredients are delivered from the feeder 34 to the first extruder 24 through an inlet 36 formed in the barrel 30, typically near the first end thereof. Preferably, the feeder 34 is positioned immediately above the extruder inlet 36, so that the blend of ingredients is formed immediately prior to entering the first extruder 24, thus minimizing or preventing separation of the ingredients. In the first extruder 24, the ingredients are processed at a suitable speed and temperature and then forced into the die head 28 at the first injection point 27.

In one embodiment using polyethylene and wood fiber ingredients, the screw 32 is rotated at a rate of about 10-50 rpm, and preferably about 15-34 rpm, to advance the ingredients through the extruder barrel 30 and into the die head 28. Preferably, the screw 32 has a compression ratio of from about 2:1 to about 4:1, and more preferably from about 2.8:1 to about 3.6:1. The temperature of the ingredients in the extruder barrel 30 is preferably about 150-260° C., and more preferably about 175-230° C. The retention time of the ingredients in the barrel 30 is about 20-120 seconds, and more preferably about 40-80 seconds. Finally, the ingredients are advanced through the barrel 30 at a rate of about 500-2,000 lbs/hr., and more preferably about 1,000-1,500 lbs/hr.

The second extruder 26 comprises a barrel 38 having an internal chamber and a screw 40 rotatively mounted in the chamber of the barrel 38. The raw materials or ingredients making up the second composition are physically mixed or blended (typically in powder or pellet form) in a feeder 42 such as a weigh blender. These mixed ingredients are delivered from the feeder 42 to the second extruder 26 through an inlet 44 formed in the barrel 38, typically near the first end thereof. In the second extruder 26, the ingredients are processed at a suitable speed and temperature and then forced into the die head 28 at the second injection point 29, which is located downstream from the first injection point 27.

In one possible embodiment, the first composition comprises a combination of a matrix and a filler. As mentioned previously, possible matrix materials include, but are not limited to, polymers such as polypropylene, high density polyethylene (HDPE), low density polyethylene (LDPE), polyvinyl chloride (PVC), chlorinated polyvinyl chloride (CPVC), acrylonitrile butadiene styrene (ABS), ethyl-vinyl acetate (EVA), and polystyrene. Possible filler materials include, but are not limited to, sawdust, newspaper, alfalfa, wheat pulp, wood scraps (e.g., ground wood, wood flour, wood flakes, wood chips, wood fibers, wood particles), wood veneers, wood laminates, cardboard, straw, cotton, rice hulls, paper, coconut shells, peanut shells, bagasse, plant fibers, bamboo fiber, palm fiber, kenaf, and mixtures thereof. The second composition includes a matrix material (typically, but not necessarily, the same matrix material as in the first composition) preferably combined with one or more additives such as process aids, lubricants, stabilizers, accelerators, inhibitors, enhancers, and colorants. The second composition also contains less filler material than the first composition. Here, "contains less filler material" can mean that either the second composition includes some filler material but a smaller amount than the first composition or the second composition contains no filler at all.

The first composition is injected into the die head 28 through the first injection point 27 so as to create a first stream 46 in the die head 28. The second composition is injected into the die head 28 through the second injection point 29 so as to create a second stream 48 in the die head 28, which flows into the first stream 46. The second injection point 29 is positioned on the die head 28 such that the second stream 48 is located at what will become the first face 11 of the composite article 10. The second injection point 29 is located relative to the die head outlet 31 so as to permit some mixing between the first composition stream 46 and the second composition stream 48 to produce a partially mixed composition stream that is discharged through the outlet 31. Specifically, the second injection point 29 is located a distance, L, upstream from the outlet 31 that is sufficient to allow a desired degree of mixing between the two streams 46 and 48 before being discharged through the outlet 31. The partially mixed composition is forced out of the die head 28 through the outlet 31 and assumes the desired shape of the composite article 10. The two streams 46 and 48 do not completely mix, but the incomplete mixing of the streams 46 and 48 results in an extruded composite article 10 having the first and second regions 18 and 20 of differing compositional makeup. The first region 18 comprises a mix of the first and second compositions, and the second region 20 comprises only the first composition.

The extruded composite article 10 discharged from the die head 28 is cut to the desired length by a conventional cutter. Prior to being cut, the extruded composite article 10 can be cooled in a cooling chamber (not shown) and embossed with a suitable embossing device (not shown) to impart a desired surface design such as one that simulates wood grain.

Figure 5:
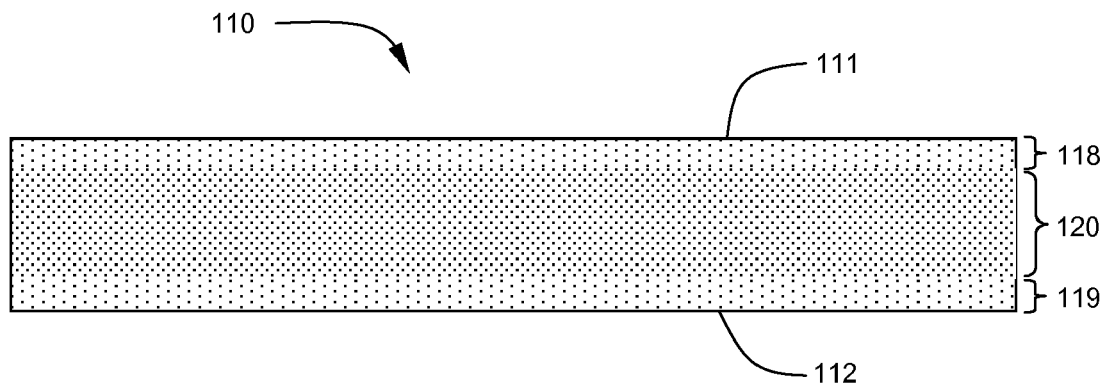
FIG. 5 is a side view of a composite article in accordance with a second embodiment of the present invention.
Figure 6:
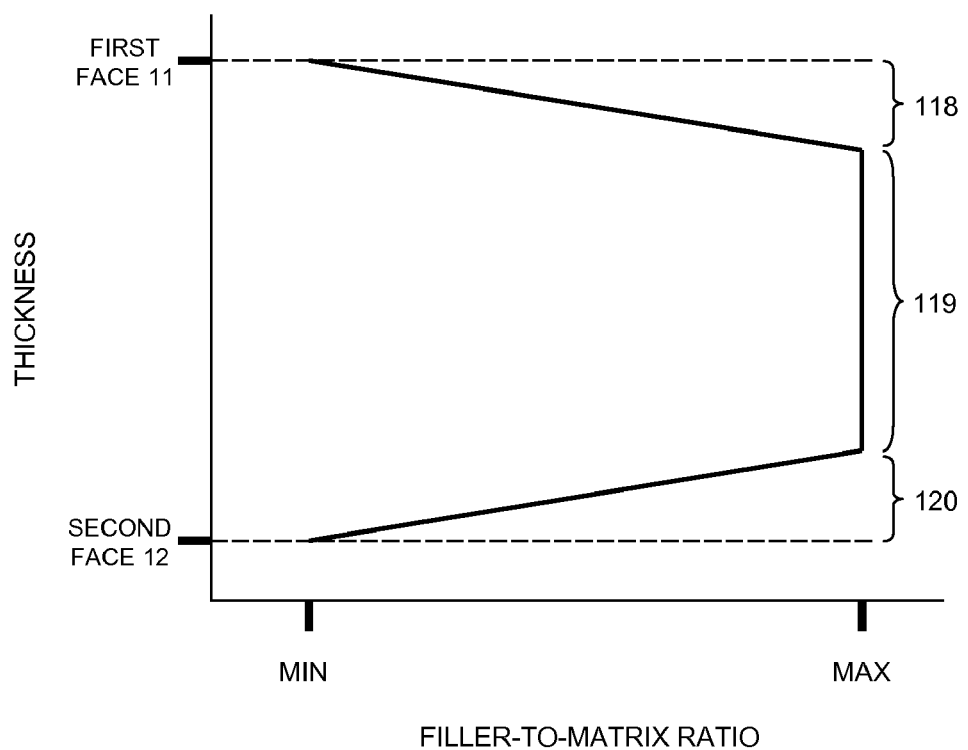
FIG. 6 is a graph plotting the filler-to-matrix ratio against article thickness for the composite article of FIG. 5.

Referring to FIGS. 5 and 6 a second embodiment of a non-laminated composite article 110 is shown. The composite article 110 defines three regions 118, 119 and 120 of differing compositional makeups that are juxtaposed along the first transverse dimension (i.e., across the thickness). In this case, the first region 118 encompasses the first face 111 of the composite article 110, and the third region 120 encompasses the second face 112. The second region 119 is positioned between the first and third regions 118 and 120. Generally, the second region 119 comprises a large majority of the thickness of the composite article 110 and is thus thicker than the first and third regions 118 and 120, which are typically of equal thickness.

The three regions 118, 119 and 120 all generally comprise a matrix-filler composite, but have differing compositional makeups. Namely, the first and third regions 118 and 120 have a lower filler content than the second region 119. Although the first and third regions 118 and 120 contain less filler than the second region 119, it is generally preferred that the filler content of the first and third regions 118 and 120 is not zero. The first and third regions 118 and 120 preferably contain some filler in order to enhance the wood-like appearance of the first and second faces 111 and 112. In one embodiment, the first and third regions 118 and 120 each comprise approximately 1-2% filler by weight and the second region 119 comprises approximately 60% filler by weight.

In addition, the first and third regions 118 and 120 preferably include one or more additives, such as the additives described above, which are not included in the second region 119. In other words, only the first and third regions 118 and 120 have the additives, such as antimicrobials, thereby achieving the benefits of the additives at the first and second faces 111 and 112, but reducing the cost by not having additives throughout the entire thickness of the board. The cost savings realized with this second embodiment may not be as significant as those seen with the first embodiment, but both of the first and second faces 111 and 112 receive the benefits added by the additives. The thick second region 119, with its high filler content, lends wood-like stiffness and strength to the composite article 110. It is possible that the second region 119 includes some additives or materials other than matrix and filler, but the relatively high concentrations of protective additives of the type discussed above are generally limited to the first and third regions 118 and 120.

The filler material in the first and third regions 118 and 120 is distributed so as to present a density gradient along the first transverse dimension of the composite article 110, with minimum filler density being at the first and second faces 111 and 112. That is, the filler content varies in density or concentration across the thickness of the each of the first and third regions 118 and 120. Another way of stating this is that the filler-to-matrix ratio varies in the transverse dimension in the first and third regions 118 and 120, and specifically decreases approaching the first and second faces 111 and 112. This is depicted graphically in FIG. 6, which plots the filler-to-matrix ratio across the thickness of the composite article 110. As shown, the filler-to-matrix ratio is at a uniform maximum in the second region 119 and decreases in the first and third regions 118 and 120, with the minimum ration (and hence minimum filler density) occurring at the first face 111. While the rate of change of the filler-to-matrix ratio in first and third regions 118 and 120 is shown to be linear in FIG. 6, it should be noted that these rates of change could also be non-linear.

While specific embodiments of the present invention have been described, it will be apparent to those skilled in the art that various modifications thereto can be made without departing from the spirit and scope of the invention as defined in the appended claims.

What is claimed is:

1. A method of forming a non-laminated composite article, said method comprising:
    providing a die head having an outlet;
    injecting a first composition into said die head at a first point to create a first stream, said first composition comprising a combination of matrix and cellulosic filler materials;
    injecting a second composition into said die head at a second point to create a second stream, said second composition containing less cellulosic filler material than said first composition, and wherein said second point is located relative to said outlet so as to permit a desired degree of mixing between said first and second streams so as to produce a partially mixed composition stream; and
    discharging said partially mixed composition stream through said outlet, wherein said desired degree of mixing is such that discharging said partially mixed composition stream through said outlet forms a non-laminated composite article, said non-laminated composite article having a first region that encompasses a surface of said non-laminated composite article and comprises a mix of said first and second compositions and a second region that comprises only said first composition, and wherein said cellulosic filler material is distributed in said first region so as to present a density gradient throughout said first region with a minimum filler density at said surface of said non-laminated composite article.

2. The method of claim 1 wherein said second point is located upstream of said outlet a predetermined distance which is sufficient to allow said desired degree of mixing.

3. The method of claim 1 wherein said second composition includes one or more additives.

4. The method of claim 1 wherein said second region comprises approximately 60% filler material by weight and said first region comprises approximately 1-2% filler material by weight.

* * * * *